(12) United States Patent
Wang et al.

(10) Patent No.: US 7,304,198 B2
(45) Date of Patent: Dec. 4, 2007

(54) STAGED ALKYLATION IN MICROCHANNELS

(75) Inventors: Yong Wang, Richland, WA (US); James F. White, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 349 days.

(21) Appl. No.: 10/846,830

(22) Filed: May 14, 2004

(65) Prior Publication Data
US 2005/0256358 A1 Nov. 17, 2005

(51) Int. Cl.
C07C 2/58 (2006.01)
(52) U.S. Cl. .................. 585/716; 585/449; 585/716
(58) Field of Classification Search .............. 585/449, 585/458, 462, 464, 714, 716, 724, 731
See application file for complete search history.

(56) References Cited

U.S. PATENT DOCUMENTS

| | | | |
|---|---|---|---|
| 4,392,362 A | 7/1983 | Little | |
| 5,430,211 A | 7/1995 | Pogue et al. | |
| 5,727,618 A | 3/1998 | Mundinger et al. | |
| 5,750,818 A * | 5/1998 | Mehlberg et al. | 585/709 |
| 5,811,062 A | 9/1998 | Wegeng et al. | |
| 5,817,908 A * | 10/1998 | Mehlberg | 585/716 |
| 5,849,965 A | 12/1998 | Mehlberg et al. | 585/323 |
| 5,997,826 A | 12/1999 | Lodeng et al. | 422/190 |
| 6,051,521 A * | 4/2000 | Cheng et al. | 502/86 |
| 6,159,358 A | 12/2000 | Mulvaney et al. | |
| 6,235,959 B1 | 5/2001 | Hirschauer et al. | |
| 6,255,538 B1 | 7/2001 | Dougherty et al. | |
| 6,303,840 B1 | 10/2001 | Poliakoff et al. | |
| 6,395,945 B1 | 5/2002 | Randolph | |
| 6,479,721 B1 | 11/2002 | Gajda et al. | |
| 6,491,880 B1 | 12/2002 | Wang et al. | |
| 6,492,571 B1 | 12/2002 | He et al. | |
| 6,533,840 B2 | 3/2003 | Martin et al. | |
| 6,558,634 B1 | 5/2003 | Wang et al. | |
| 6,616,909 B1 | 9/2003 | Tonkovich et al. | |
| 6,642,425 B2 | 11/2003 | Winder et al. | |
| 6,642,426 B1 * | 11/2003 | Johnson et al. | 585/449 |
| 6,680,044 B1 | 1/2004 | Tonkovich et al. | |
| 6,713,036 B1 | 3/2004 | Vanden Bussche et al. | |
| 6,746,651 B1 | 6/2004 | Ponzo et al. | |
| 6,747,178 B1 | 6/2004 | Harston et al. | |
| 6,749,814 B1 | 6/2004 | Bergh et al. | |
| 6,749,817 B1 | 6/2004 | Mulvaney et al. | |
| 6,969,746 B2 | 11/2005 | Krull et al. | |
| 7,125,540 B1 | 10/2006 | Wegeng et al. | |

(Continued)

FOREIGN PATENT DOCUMENTS

WO WO 01/54807 A1 * 8/2001

(Continued)

OTHER PUBLICATIONS

International Search Report for PCT/US2005/016720, mailed Sep. 21, 2005.

*Primary Examiner*—Glenn Caldarola
*Assistant Examiner*—In Suk Bullock
(74) *Attorney, Agent, or Firm*—Derek Maughan; Frank Rosenberg

(57) ABSTRACT

The invention provides methods and systems for alkylating a paraffinic feed stream in a microchannel utilizing the staged addition of olefin.

29 Claims, 1 Drawing Sheet

Iso-paraffins

Olefins

U.S. PATENT DOCUMENTS

| | | |
|---|---|---|
| 2002/0028164 A1 | 3/2002 | Schuttle et al. |
| 2002/0192118 A1 | 12/2002 | Zech et al. |
| 2004/0034111 A1 | 2/2004 | Tonkovich et al. |
| 2004/0125689 A1 | 7/2004 | Ehrfeld et al. |
| 2004/0136902 A1 | 7/2004 | Plath et al. |
| 2004/0156762 A1 | 8/2004 | Schuppich et al. |
| 2004/0220434 A1 | 11/2004 | Brophy et al. |
| 2005/0176832 A1 | 8/2005 | Tonkovich et al. |
| 2005/0232076 A1 | 10/2005 | Yang et al. |

FOREIGN PATENT DOCUMENTS

| | | |
|---|---|---|
| WO | WO 01/95237 | 12/2001 |
| WO | WO 02/064248 A3 | 8/2002 |
| WO | WO2004037418 | 5/2004 |
| WO | WO2004045760 | 6/2004 |
| WO | WO2004050799 | 6/2004 |
| WO | WO2004101138 | 11/2004 |

* cited by examiner

US 7,304,198 B2

STAGED ALKYLATION IN MICROCHANNELS

Alkylation is an industrially important reaction for fuel and chemical productions. For example, the alkylation of iso-paraffins by olefins is an important industrial process that plays a significant role in the synthesis of gasoline. In this process, the higher the paraffin/olefin ratio, the higher the octane of alkylate produced. However, too high paraffin/olefin ratios are economically unattractive because of the higher separation and recirculation costs required for unreacted paraffin. Therefore, an optimum of paraffin/olefin ratio of 5/1 to 8/1 is commonly used in plants where sulfuric acid is the catalyst, while HF plants typically operate in the range of 10/1 to 15/1. The alkylation of iso-paraffins by olefins on solid acid catalysts have attracted tremendous research interests for the past three decades due to their potential replacement of the environmentally problematic homogeneous acid catalysts, such as sulfuric acid and hydrofluoric acid. However, there has been no commercial process based on solid acid catalysts in practice, mainly due to the technical hurdle of rapid catalyst deactivation at a practical paraffin to olefin ratio (<15).

The use of staged olefin addition in conventional alkylation processes has been described. For example, in U.S. Pat. No. 5,849,965, Mehlberg et al. describe a process in which alkylating agents are added in series to a process stream containing a paraffinic substrate. Johnson et al. in U.S. Pat. No. 6,642,426 describe a process in which an alkylating agent is injected stagewise into a fluidized bed in order to alkylate an aromatic feed. These processes do not use microchannels, and they either stage alkylating agents into several reactors in series or use a fluidized bed reactor system which is undesirable because of the severe backmixing common to fluidized bed processes.

The use of microchannels for staged additions has been described. For example, Wegeng et al. in WO 01/95237 A2 describe microchannel systems in which reactants can be added stagewise. Tonkovich et al. in WO 02/064248 A2 described the staged addition of oxygen in a microchannel in an integrated combustion reactor. There are no reports in the prior scientific literature in which an alkylation with staged addition of olefin in a microchannel has actually been conducted.

SUMMARY OF THE INVENTION

In a first aspect, the present invention provides a method of alkylating a paraffinic feed stream. In this method, a paraffinic feed stream flows in a microchannel. A first olefinic stream comprising a first olefin flows into the paraffinic feed stream in the microchannel at a first location; and a second olefinic stream comprising a second olefin flows into the paraffinic feed stream in the microchannel at a second location. The second location is downstream of the first location. The first olefin reacts with the paraffinic feed stream in the presence of a first alkylation catalyst prior to the second location. The second olefin reacts with the paraffinic feed stream in the presence of a second alkylation catalyst. The first and second alkylation catalysts can be the same or different. The catalysts can be solid, fluid, or one solid and one fluid.

In a second aspect, the invention provides an alkylation system that includes: a microchannel comprising a flowing paraffinic feed stream; a first location at which a first olefinic stream comprising a first olefin flows into the paraffinic feed stream in the microchannel; a second location at which a second olefinic stream comprising a second olefin flows into the paraffinic feed stream in the microchannel; wherein the second location is downstream of the first location; a first alkylation catalyst present in the microchannel at a location prior to the second location; and a second alkylation catalyst present in the microchannel downstream of the second location. The first and second olefins can be the same or different and can be carried through a single channel or separate channels.

There are numerous advantages for conducting a staged alkylation in a microchannel reactor. Staged olefin introduction decreases the localized olefin concentration, which improves the alkylate quality, i.e., better octane value and fewer undesired side reactions due to the tendency of olefin to react with itself (i.e., less tar and polymer formation). The staged concept also reduces the overall paraffin to olefin ratio, which reduces the cost of separation and recycling of paraffins, while maintaining locally optimum paraffin to olefin ratios. Staging also increases the interfacial areas in the acid/hydrocarbon dispersions for homogenous acid catalyzed alkylations, which facilitates $H^-$ transfer and minimizes oligomerization. Alkylations are exothermic and excessively high temperature results in poor alkylate quality. The more precise control of temperature using microchannel reactors will improve the alkylate quality and improve octane number and minimize tar and polymer formation. It is believed that operating solid acid catalyzed alkylation in microchannel reactors under supercritical conditions will also provide synergistic benefits in improving catalyst life, alkylate quality, and energy efficiency.

Microchannel reactors typically operate in plug flow. Staging the olefin into the reaction channel with substantially plug flow can achieve greater control compared to conventional systems. Substantial plug flow allows for some turbulent flow aroung the locations where olefins are added to the microchannel; however, substantially plug flow means that at least the majority of flow through the microchannel is plug flow. Typically, the evaluation of plug flow is calculated and means to calculate flow are well known.

DESCRIPTION OF THE INVENTION

Figure 2:
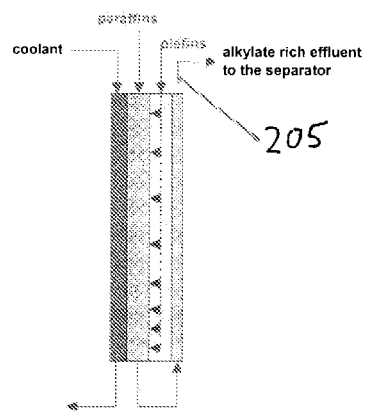
FIG. 2 schematically illustrates a system in which olefins are staged into a temperature controlled paraffin stream in a microchannel reactor. The product stream is optionally (dotted line) used to preheat the olefins.

In the invention, a stream comprising a paraffinic feed stream flows through a microchannel. The paraffinic feed stream can contain any of the paraffinic or aromatic compounds useful in conventional processes of alkylation in conventional apparatus. For purposes of the present invention, a paraffin is a hydrocarbon that can be straight, branched or cyclic, it may also be substituted with heteroatoms and/or aromatic groups; however it does not contain any non-aromatic unsaturated carbons. In many embodiments, the paraffinic feed stream is a mixture of reactive compounds (that is, reactive with olefins to produce an alkylate product) and (less preferably) may further include additional components such as gases that do not participate in the alkylation reaction, and it may contain small amounts of reactive species such as olefin (which may especially be present in the case of recycling a portion of the product stream). In some embodiments, the paraffin preferably includes iso-butane. In preferred embodiments, the paraffinic feed stream contains one or more aliphatic or aromatic compounds containing 3 to 20 carbon atoms. Thus, it must be understood that the term "paraffinic feed stream" is not limited to alkanes containing only C and H, but may include heteroatomic and aromatic compounds that are reactive in the alkylation reaction. A preferred paraffin stream contains branched chain paraffins.

An olefin is added in a staged manner into the microchannel containing the paraffinic feed stream. The olefin stream can also be any of the olefins useful in conventional processes of alkylation in conventional apparatus. For purposes of the present invention, an olefin is a hydrocarbon that can be straight, branched or cyclic, it may also be substituted with heteroatoms and/or aromatic groups; however it does contain at least one non-aromatic double bond between carbon atoms. In some embodiments, the olefin stream can be a mixture of olefins and (less preferably) may contain other components in addition to an olefin or olefins. In some embodiments, the olefin stream includes one or more of the following components: ethylene, propylene, 2-methyl-propene, 1-butene, 2-butene, 2-methyl-1-butene, 3-methyl-1-butene, and 2-methyl-2-butene. In preferred embodiments, the olefin stream includes olefins containing 2 to 12 carbon atoms. The olefin stream may also contain diolefins. The olefin stream may also contain paraffins.

In some embodiments, the paraffinic feed stream entering a micochannel contains at least 50% of iso-butane. In some embodiments, the paraffinic feed stream contains at least 50% (molar %) of one or more aromatic compounds. It is desirable to keep a low ratio of olefins to non-olefins in order to avoid undesirable polymerization reactions. In preferred embodiments, the ratio of olefins to non-olefins is 0.5 or less, more preferably 0.1 or less throughout the length of a microchannel. Of course, as with all preferred embodiments, it should be recognized that some embodiments may operate outside of this preferred range.

In addition to the paraffinic feed and olefin, a catalyst catalyzes the alkylation process. As with the reactants, the catalyst (or catalysts) can be any of the catalysts useful for catalyzing the alkylation reaction. Catalysis can be conducted in the presence of heterogeneous or homogeneous catalysts. Preferred catalysts include sulfuric acid, HF and $AlCl_3$. Some preferred solid catalysts include: sulfuric acid or triflic acid supported on $SiO_2$, alumina, silica-alumina, or dealuminated mordenite. Additives, such as $H_3PO_4$, $B(OSO_2CF_3)_3$, $B(OH)_3$, $HB(HSO_4)_4$, $BF_4H$, $FSO_3H$, $CF_3CO_2H$, $SbF_5$, $SO_3$ or small amounts of water or alcohols may assist alkylations. In some preferred embodiments, alkylation at the O or N positions of phenol or aniline can be done by olefins in presence of zeolites, ion exchange resins, heteropolyacids and their salts, either bulk or supported on $SiO_2$ or $TiO_2$, sulfated or phosphated transition metal oxides, for example, sulfated $ZrO_2$ or $Nb_2O_5$, phosphated $Nb_2O_5$ and the like. In some preferred embodiments, aromatic alkylation (for example, benzene or phenol) by olefins may occur over zeolites such as zeolite Y or ion-exchange resins such as Amberlyst or on sulfated or tungstated zirconia. Solid catalysts for some preferred embodiments may include: zeolites, ion exchange resins, sulfated or phosphated transition metal oxides, for example sulfated $ZrO_2$ or $Nb_2O_5$, phosphated $Nb_2O_5$, heteropolyacids and their salts, either bulk or supported on $SiO_2$ or $TiO_2$, supported tungsten oxides and tungsten-containing zirconia. In some preferred embodiments, side chain alkylation of alkylaromatics, phenols, aniline, and phenylacetonitrile may occur over base catalysts such as MgO, $NaN_3$/zeolite, $Na/NaOH/Al_2O_3$, $Na/K_2CO_3$, Cs or Rb exchanged zeolites. In some preferred embodiments, the alkylation catalyst is present as a coating on at least a portion of a microchannel wall. A solid catalyst can have a conventional form such as a pellet. A solid catalyst can also be present as a coating on at least one microchannel wall. A solid catalyst can also be in the form of a large pore material such as can be formed by depositing an alkylation catalyst on a large pore substrate.

Examples of preferred large pore substrates include commercially available metal foams and metal felts. Prior to depositing any coatings, a large pore substrate has a porosity of at least 5%, more preferably 30 to 99%, and still more preferably 70 to 98%. In some preferred embodiments, a large pore substrate has a volumetric average pore size, as measured by BET, of 0.1 μm or greater, more preferably between 1 and 500 μm. Preferred forms of porous substrates are foams and felts and these are preferably made of a thermally stable and conductive material, preferably a metal such as stainless steel or FeCrAlY alloy. These porous substrates can be thin, such as between 0.1 and 1 mm. Foams are continuous structures with continuous walls defining pores throughout the structure. Felts are nonwoven fibers with interstitial spaces between fibers and includes tangled strands like steel wool. Felts are conventionally defined as being made of nonwoven fibers. In one embodiment, the large pore substrate has a corrugated shape that could be placed in a reaction chamber (preferably a small channel) of a steam reformer. Various substrates and substrate configurations are described in U.S. Pat. Applications Ser. No. 09/640,903 (filed Aug. 16, 2000), U.S. Pat. No. 6,680,044 which is incorporated by reference. Another preferred substrate is a finned substrate that is characterized by the presence of fins (such as squarewave type fins) on the substrate's surface.

A catalyst with large pores preferably has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions.

In some preferred embodiments, the catalyst comprises a metal, ceramic or composite substrate having a layer or layers of a catalyst material or materials deposited thereon. The porosity can be geometrically regular as in a honeycomb or parallel pore structure, or porosity may be geometrically tortuous or random. Examples of porous support materials include felts (nonwoven fibers or strands), foams (including a foam metal or foam ceramic), fins and honeycombs. In embodiments employing a porous substrate, the average pore size (volume average) of the catalyst layer(s) is preferably smaller than the average pore size of the substrate.

In a preferred embodiment, the catalyst support includes a thermally conductive metallic fin that is sized to fit within a microchannel. Alternatively, the finned support could be fabricated directly within the microchannel and be integral to the microchannel. One method of fabrication within a microchannel comprises the use of a slitting saw, partial etching using a photochemical process, or a laser EDM. This type of support provides numerous advantages including: high heat flux with short heat transfer distances, high surface area, and low pressure drop. Preferably, the support has a height (including fins) of less than 5 mm and preferably less than 2 mm and a fin-to-fin separation of 1000 µm or less, and in some embodiments, a fin-to-fin separation of 150 to 500 µm. The fin structure can be integral with a reaction chamber (and thus coated in situ), or as a separate insert that can be coated prior to being inserted into a reaction chamber.

Temperature and pressure conditions can be those described for alkylation processes conducted in conventional apparatus. A preferred temperature range for alkylation of aliphatic paraffinic feed streams is from about 0° C. to about 100° C. In some embodiments, temperature ranges for particular catalysts may include $AlCl_3$ at 60-70° C., on HF at 10-40° C., and on sulfuric acid at 5-10° C. A preferred temperature range for aromatic alkylation ranges from about 150 to about 500° C. In some preferred embodiments, the pressure is in the range of 100-5000 kpa. In some preferred embodiments, the pressure will be the autogenous pressure generated by the process stream at reaction temperature. In some preferred embodiments, the process stream in the microchannel is in a supercritical state; this is particularly preferred in cases in which the alkylation catalyst is a solid catalyst. Similar to conventional systems, unreacted paraffins can be separated and recycled into the reactor.

Olefin can react with itself via oligomerization which can rapidly degrade the reaction system and product quality. Therefore, it is desirable to control reaction conditions and surface acidity where olefin is introduced. In one embodiment, olefin may be introduced into the microchannel in a zone where there is no catalyst present so that the olefin and paraffin may become uniformly mixed before contacting a catalyst further along in the microchannel.

Hydrogen may be introduced along with the paraffin stream or staged along the channel (either carried along with the olefin, or, more preferably, transported in a separate channel) to minimize the oligomerization or catalyst deactivation due to oligomerization.

The amount of catalyst or catalytic sites or the acid strength may be varied along the length of the microchannel so that reaction of the olefin with paraffin is maximized and reaction of olefin with itself is minimized. In one embodiment, acid strength of a solid acid catalyst contained in the channel or on the channel wall can be varied so that maximum reactivity is located where olefin concentration is lowest. For example, in a staged reactor in which paraffin concentration decreases along the length of a reaction channel, a solid acid catalyst in the microchannel can be disposed with a decreasing concentration down the length of the reaction channel. For another example, solid acid catalysts with varying acid strength can be placed in the reaction channel so that a desired acid strength gradient can be achieved (for example, in a similar manner to that described above). In another embodiment the number of acid sites/moles of feed, or the concentration of H+ ions can be varied so that the maximum reactivity is achieved where the olefin concentration is lowest.

Olefin oligomerization is typically favored by higher temperature. Therefore, precise control of temperature using microchannel reaction technology will minimize oligomerization. Since alkylation is exothermic, additional temperature control can also be achieved by tailoring the extent of alkylation reaction. Controlling the amount of alkylating agents staged, flow directions, and acid site density and/or acid strength along channel have direct impacts on tailoring the extent of alkylation. In some preferred embodiments, temperature is controlled to vary by less than 10° C. over at least 70% (more preferably at least 90%) of the reaction zone. The length of the reaction zone is the length along the microchannel where a substantial amount of reaction occurs; in general, the area of this zone will be readily recognized by persons skilled in the art. For example, in the case of a solid catalyst, the reaction zone is the zone where solid catalyst is present along with paraffin and olefin at a temperature sufficiently high for significant reaction to occur (not a quench zone or cold zone). For a homogeneous reaction, the reaction zone is the zone where acid catalyst is present along with paraffin and olefin at a temperature sufficiently high for significant reaction to occur. In another embodiment, a optimized temperature gradient along a reaction channel may be desired. For example, near the entry of a channel (for example, within the first 20% of the length of a reaction zone, where the temperature is defined as the highest temperature within the length) where paraffin/olefin ratio is higher, a higher temperature (for example, at least 10° C., or at least 20° C., higher than the temperature at the end of the channel or end of the reaction zone) may be desired to achieve faster kinetics with less concern of oligomerization since paraffin/olefin ratio is higher. Such a temperature gradient can be realized by controlling the flow rate and/or flow direction (i.e., counter flow) of coolant in the adjacent heat exchange channel.

In the present invention, a paraffinic feed stream flows in a microchannel. In the present invention, a "microchannel" is defined as a channel having at least one dimension of 5 millimeters (mm) or less, in some embodiments 2 mm or less, in some emboidments 1 mm or less, and in some embodiments, at least 0.1 mm. As is understood in the art, a microchannel is not merely an orifice. The length of a microchannel (that is, the direction of flow during normal operation) is not the shortest dimension of a microchannel. Both height and width of a microchannel are substantially perpendicular to the direction of flow of reactants through the reactor. Microchannels are also defined by the presence of at least one inlet that is distinct from at least one outlet—microchannels are not merely channels through zeolites or mesoporous materials. The height and/or width of the reaction microchannel is preferably about 2 mm or less, and more preferably 1 mm or less. Preferably, the length of a microchannel is greater than 1 cm, in some embodiments in the range of about 1 to 300 cm. The sides of the microchannel are defined by a microchannel wall of walls. The choice of material for the walls depends on the intended use. These walls are preferably made of a hard material such as a ceramic, an iron based alloy such as steel, or monel. In some embodiments, the microchannel walls are comprised of a stainless steel or Inconel® which is durable and has good thermal conductivity. In other cases, the microchannel wall may be constructed of a highly corrosion resistant material such as titanium or tantalum. The microchannel wall may also be constructed of special alloys with special surface features or chemistries which facilitate the attachment and retention of desirable catalytic coatings. The microchannel devices can be made by known methods, and in some preferred embodiments are made by laminating interleaved plates (also known as "shims"), and in some preferred embodiments, shims designed for reaction channels are interleaved with shims designed for heat exchange.

In some preferred embodiments, the microchannel devices are microchannel reactors that include a plurality of microchannel reaction channels, preferably in thermal contact with a plurality of adjacent heat exchange microchannels. A plurality of microchannels may contain, for example, 2, 10, 100, 1000 or more channels. In preferred embodiments, the microchannels are arranged in parallel arrays of planar microchannels, for example, at least 3 arrays of planar microchannels. In some preferred embodiments, multiple microchannel inlets are connected to a common header and/or multiple microchannel outlets are connected to a common footer. During operation, interleaved heat exchange layers (if present) contain heating and/or cooling fluids flowing in microchannels. Non-limiting examples of this type of known reactor usable in the present invention include those of the microcomponent sheet architecture variety (for example, a laminate with microchannels) exemplified in U.S. Pat. Nos. 6,200,536 and 6,219,973 (both of which are hereby incorporated by reference). Performance advantages in the use of this type of architecture include their relatively large heat and mass transfer rates. Microchannel reactors can combine the benefits of good heat and mass transfer, excellent control of temperature, residence time and minimization of by-products. Pressure drops can be low, allowing high throughput. Furthermore, use of microchannel reactors can achieve better temperature control, and maintain a relatively more isothermal profile, compared to conventional systems. In addition to the process microchannel(s) additional features such as microchannel or non-microchannel heat exchangers may be present. Microchannel heat exchangers are preferred. Heat exchange fluids may flow through adjacent heat transfer microchannels, and can be gases or liquids and may include steam, liquid metals, or any other known heat exchange fluids—the system can be optimized to have a phase change in the heat exchanger. In some preferred embodiments, multiple heat exchange layers are interleaved with multiple reaction microchannels (for example, at least 10 heat exchanger layers interleaved with at least 10 process microchannel layers. Microchannels are defined by microchannel walls that limit flow.

In this invention, one or more olefins are added to the paraffinic process stream at multiple points along the length of a microchannel. In other words, the olefins are added in a staged addition. Preferably, the process stream remains in the same continuous microchannel, without being withdrawn from the microchannel, and olefins are added in at least two locations along the length of the microchannel. Staging can be done by adding olefin through orifices in the microchannel walls; alternatively or in addition, all or a part of a microchannel wall can be made of a porous material. The olefin can be carried to the orifices in tubes or other conduits, or carried in a layer (preferably a microchannel) that is directly adjacent to the microchannel carrying the paraffinic feed stream.

Figure 1:
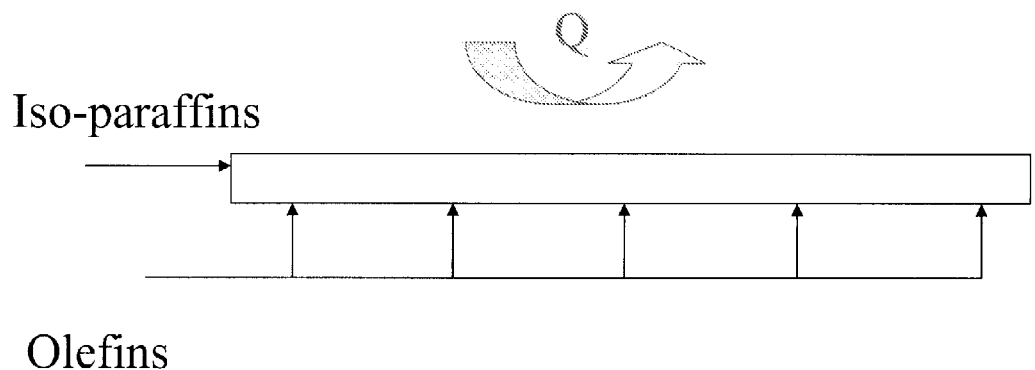
FIG. 1 schematically illustrates the staged addition of olefins to a feed stream containing iso-paraffins. The white rectangle represents a microchannel.

One embodiment of the invention is conceptually illustrated in FIG. 1. A paraffinic feed stream (in the figure, iso-paraffins) is passed through a microchannel (the white rectangle) while olefins are added at multiple points along the length of the microchannel. In preferred embodiments, olefins are added at least 3 points along the length of a microchannel. Heat (Q) is removed from the reaction channel, preferably into a coolant that passes through an adjacent channel.

Another embodiment of the invention is schematically illustrated in FIG. 2. Olefins can be staged along the paraffin channel. The orifice geometries and their locations can be designed to achieve desired distribution of olefins into paraffin stream. Optionally, the temperature of olefin channel can be controlled by either pre-heating (205) using the alkylate product stream or a coolant such as oil, water, partial boiling of water, molten salt, hydrocarbons, or paraffin feedstream. The dotted line indicates that all or part of the product stream can be used to preheat the olefins. Although paraffin, coolant and olefin are shown in co-flow and product return in counter-flow; any combination of flow directions can be used. For example, the paraffin and olefin streams can be in counterflow and the heat exchange channel or channels in cross-flow. In addition to the process channel (containing the paraffin stream), in some preferred embodiments, some or all of the other channels (olefin, coolant, olefin-preheat) are microchannels. Paraffin channel geometries and paraffin flowrate can be optimized to achieve a plug flow. This concept can be applied to both homogeneous acid catalyzed alkyation and solid acid catalyzed alkyation. In the case of homogeneous acid, acid can be premixed with paraffins. Or, additional acid can be staged along an alkylation channel from a different channel wall from that where olefins are staged (not shown). One potential advantage is that acid content or number of acid sites can be tailored along the reaction channel. Another advantage is that staging acid also increases the interfacial areas in the acid/hydrocarbon dispersions, which facilitates H$^-$ transfer and minimizes oligomerization. Staging acid may be desired to provide a better control of alkyation over side reactions such as oligomerization and cracking. In the case of solid acid catalysts, catalysts can be coated on the channel walls or filled in the entire channel. Again, catalyst bed can have gradients along the alkylation channel in terms of acid site density and acid strength to achieve an optimal alkylation.

What is claimed:

1. A method of alkylating a paraffinic feed stream, comprising:
    flowing a paraffinic feed stream in a microchannel;
    adding a first olefinic stream comprising a first olefin to the paraffinic feed stream in the microchannel at a first location; and adding a second olefinic stream comprising a second olefin to the paraffinic feed stream in the microchannel at a second location;
    wherein the second location is downstream of the first location;
    wherein the first olefin in the first stream reacts with the paraffinic feed stream in the presence of a first alkylation catalyst prior to the second location;
    wherein the second olefin in the second stream reacts with the paraffinic feed stream in the presence of a second alkylation catalyst; and
    wherein no catalyst is present at the second location, and wherein a solid catalyst is disposed between the first and second locations.

2. The method of claim 1 further comprising a step of transferring heat from the microchannel to an adjacent heat exchange channel.

3. The method of claim 1 wherein the first olefin is the same as the second olefin.

4. The method of claim 3 wherein the temperature and pressure at the second location are substantially the same as at the first location.

5. The method of claim 3 wherein the paraffinic feed stream enters an inlet to the microchannel, flows past the first location, and flows past the second location without ever leaving the microchannel.

6. The method of claim 3 wherein flow in the microchannel is substantially plug flow.

7. The method of claim 5 wherein the paraffinic feed stream entering an inlet to the microchannel contains greater than 50% iso-butane.

8. The method of claim 5 wherein the paraffinic feed stream entering an inlet to the microchannel contains greater than 50% aromatic compounds.

9. The method of claim 7 wherein, subsequent to passing the second location, resulting alkylated products are removed from the process stream and at least a portion of the unreacted paraffinic feed stream is recycled to the inlet of the microchannel.

10. The method of claim 1 wherein the first catalyst and the second catalyst are the same and each catalyst is a homogeneously dispersed acid catalyst.

11. The method of claim 1 wherein the first catalyst and the second catalyst are the same and each catalyst is a solid catalyst disposed as a wall coating on at least a portion of a microchannel wall.

12. A method of alkylating a paraffinic feed stream, comprising:
flowing a paraffinic feed stream in a microchannel;
adding a first olefinic stream comprising a first olefin to the paraffinic feed stream in the microchannel at a first location; and adding a second olefinic stream comprising a second olefin to the paraffinic feed stream in the microchannel at a second location;
wherein the second location is downstream of the first location;
wherein the first olefin in the first stream reacts with the paraffinic feed stream in the presence of a first alkylation catalyst prior to the second location; and
wherein the second olefin in the second stream reacts with the paraffinic feed stream in the presence of a second alkylation catalyst; and
wherein the paraffinic feed stream is in a supercritical state in the microchannel.

13. The method of claim 3 wherein ratio of olefins to non-olefinic hydrocarbons is maintained at 0.5 or less throughout the microchannel.

14. A method of alkylating a paraffinic feed stream, comprising:
flowing a paraffinic feed stream in a microchannel;
adding a first olefinic stream comprising a first olefin to the paraffinic feed stream in the microchannel at a first location; and adding a second olefinic stream comprising a second olefin to the paraffinic feed stream in the microchannel at a second location;
wherein the second location is downstream of the first location;
wherein the first olefin in the first stream reacts with the paraffinic feed stream in the presence of a first alkylation catalyst prior to the second location; and
wherein the second olefin in the second stream reacts with the paraffinic feed stream in the presence of a second alkylation catalyst; and
further comprising a third olefinic stream comprising a third olefin;
wherein olefin is added into the paraffinic stream from at least 3 points along the length of the microchannel, comprising adding the first olefinic stream at a first location, the second olefinic stream at a second location and the third olefinic stream at a third location;
wherein the first, second and third olefins are the same;
wherein a reaction between the paraffinic stream and the olefin is catalyzed by a solid acid catalyst; and wherein acid strength of the solid acid catalyst is varied so that maximum catalyst concentration is located in the reaction zone of the microchannel where olefin concentration is lowest.

15. The method of claim 1 wherein no catalyst is present at the first or second locations, and wherein a solid catalyst is disposed between the first and second locations.

16. The method of claim 1 wherein the first olefin and the second olefin are the same and further wherein, prior to the steps of adding the first olefinic stream at a first location and adding a second olefinic stream at a second location, the first and second olefin are carried in a common stream in a common channel that is adjacent to the microchannel.

17. The method of claim 16 wherein the common channel is heated by a product stream carried in a product channel.

18. The method of claim 1 wherein the paraffinic stream is substantially in plug flow.

19. The method of claim 1 further comprising the step of adding a fluid acid catalyst into at least 2 locations along the length of the microchannel.

20. The method of claim 12 wherein no catalyst is present at the first or second locations, and wherein a solid catalyst is disposed between the first and second locations.

21. The method of claim 12 wherein the first alkylation catalyst is a solid catalyst and the second alkylation catalyst is a solid catalyst.

22. The method of claim 21 wherein, after passing over the second alkylation catalyst, unreacted paraffins in the feed stream are separated and recycled.

23. The method of claim 12 wherein there is a decreasing concentration of solid acid catalyst down the length of the reaction channel.

24. The method of claim 1 wherein there is a decreasing concentration of solid acid catalyst down the length of the microchannel.

25. The method of claim 14 wherein the microchannel comprises plural solid acid catalysts with varying acid strength, and wherein the acid strength decreases down the length of the microchannel.

26. The method of claim 12 wherein the miocrochannel possesses a reaction zone where a substantial amount of reaction occurs, and wherein temperature is controlled to vary by less than 10° C. over at least 70% of the reaction zone.

27. The method of claim 14 further comprising a step of transferring heat from the microchannel to an adjacent heat exchange channel.

28. The method of claim 27 wherein the miocrochannel possesses a reaction zone where a substantial amount of reaction occurs, and wherein temperature is controlled to vary by less than 10° C. over at least 70% of the reaction zone.

29. The method of claim 14 wherein no catalyst is present at the first or second locations, and wherein a solid catalyst is disposed between the first and second locations.

* * * * *